(12) United States Patent
Atrash et al.

(10) Patent No.: US 8,583,037 B2
(45) Date of Patent: Nov. 12, 2013

(54) INDUCTIVE DATA COMMUNICATION

(75) Inventors: Amer Atrash, Richardson, TX (US);
Jonathan Knight, Richardson, TX (US);
Ross Teggatz, McKinney, TX (US);
Michael Sullivan, Richardson, TX (US);
Andrew Blaszczak, Richardson, TX (US)

(73) Assignee: Triune IP LLC, Richardson, TX (US)

( * ) Notice: Subject to any disclaimer, the term of this patent is extended or adjusted under 35 U.S.C. 154(b) by 223 days.

(21) Appl. No.: 13/045,493

(22) Filed: Mar. 10, 2011

(65) Prior Publication Data
US 2011/0223859 A1   Sep. 15, 2011

Related U.S. Application Data

(60) Provisional application No. 61/312,246, filed on Mar. 10, 2010, provisional application No. 61/312,247, filed on Mar. 10, 2010, provisional application No. 61/312,248, filed on Mar. 10, 2010, provisional application No. 61/312,249, filed on Mar. 10, 2010.

(51) Int. Cl.
*H04B 5/00* (2006.01)

(52) U.S. Cl.
USPC ............................ 455/41.1; 455/41.2; 455/73

(58) Field of Classification Search
USPC .............. 455/41.1, 41.2, 73, 88, 426.1, 550.1
See application file for complete search history.

(56) References Cited

U.S. PATENT DOCUMENTS

| | | | |
|---|---|---|---|
| 7,215,924 B2 * | 5/2007 | Palermo et al. .............. | 455/41.1 |
| 7,426,239 B2 * | 9/2008 | Taghizadeh-Kaschani | .. 375/259 |
| 2004/0041944 A1 * | 3/2004 | Matsumoto ................... | 348/465 |

* cited by examiner

*Primary Examiner* — Tuan H Nguyen
(74) *Attorney, Agent, or Firm* — Hovey Williams LLP

(57) ABSTRACT

Data transmission systems and methods are disclosed in which a transmitter and a receiver, each having an inductor, are configured for wirelessly transferring data and power between them. Error detection is implemented for implementing error correction techniques by making corrections at the receiver, at the transmitter, or both. In preferred embodiments of the invention, error correction approaches include oversampling, power adjustments, and frequency adjustments. In preferred implementations, the systems and methods are used for transmitting both power and data using a single pair of inductors.

21 Claims, 4 Drawing Sheets

INDUCTIVE DATA COMMUNICATION

PRIORITY ENTITLEMENT

This application is entitled to priority based on Provisional Patent Application Ser. Nos. 61/312,246; 61/312,247; 61/312,248; and 61/312,249; filed on Mar. 10, 2010, which are incorporated herein for all purposes by this reference. This application and the Provisional Patent Applications have at least one common inventor.

TECHNICAL FIELD

The invention relates to wireless data transfer. In particular, the invention is directed to wireless data transfer apparatus and methods using coupled inductors.

BACKGROUND OF THE INVENTION

It is known to use coupled inductors to facilitate wireless data transfer. Wireless power transmission can also be accomplished using coupled inductors. Several challenges arise in using coupled inductors for sending and receiving data in the presence of active inductive power transmission. Among them, maintaining data integrity and bandwidth are of concern.

Due to these and other problems and potential problems, improved couple inductor power and data transmission would be useful and advantageous contributions to the arts.

SUMMARY OF THE INVENTION

In carrying out the principles of the present invention, in accordance with preferred embodiments, the invention provides advances in the arts with novel methods and apparatus directed to the transfer of data using an inductive coupling. In preferred embodiments, systems include capabilities for power transfer as well as unidirectional and bidirectional data transfer.

According to aspects of the invention, examples of preferred embodiments include data transmission systems and methods with a transmitter inductor for wirelessly transmitting a data signal to a receiver inductor. An error detector is provided for identifying data error. The error detector triggers the performance of a receiver error correction algorithm and/or a transmission error correction algorithm.

According to additional aspects of the invention, in examples of preferred embodiments, oversampling may be used to increase and decrease sample size, increase and decrease the number of sample points, or shift the sample window in response to the receiver error correction algorithm.

According to more aspects of the invention, preferred embodiments also include capabilities for responsively increasing and decreasing the transmission power and/or frequency based on the transmission error correction algorithm.

According to another aspect of the invention, preferred systems and methods are adapted for transmitting and receiving both power and data According to an additional aspect of the invention, the preferred systems and methods may be implemented in configurations adapted for the bidirectional exchange of data.

The invention has advantages including but not limited to one or more of, improved bandwidth, improved data integrity, and improved power transfer control. These and other advantageous features and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

A related application, which is hereby incorporated herein for all purposes by this reference, U.S. patent application Ser. No. 12/813,180 includes wireless data receiving systems and techniques using coupled inductors. The related application and the present application have a common assignee and at least one inventor in common.

It has been determined that high inductance coils (micro-Henries) switched at low frequencies (hundreds of kHz) are effective for power transfer in applications such as battery chargers and power converters, for example. In order to transmit a high bandwidth of data effectively, however, several challenges arise. Tuning of the system is often required in order to optimize transmission frequency in the presence of parasitic elements that cause ringing or otherwise distort the data signal. Managing peak currents in the inductors, maintaining bandwidth in the presence of varying system conditions, e.g., changes in temperature, coil alignment, or distance between coils, and interference when sending and receiving data in the presence of inductive power transmission can also present problems. The inventors have determined that a reliable system for data and power transmission can be implemented, preferably using smaller inductance coils (10's to 100's of nano-Henries), switched at much higher frequencies (10's to 100's of MHz).

Figure 1:
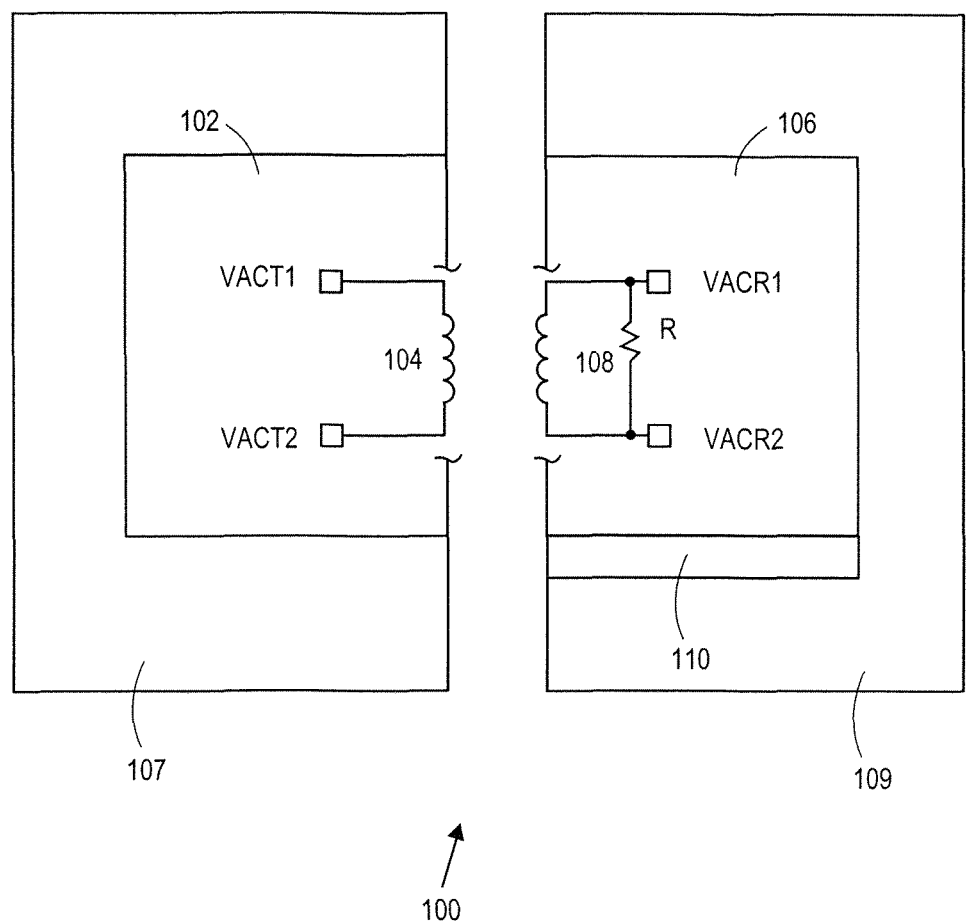
FIG. 1 is a simplified schematic circuit diagram illustrating an example of preferred embodiments of systems for wireless data communication according to the invention.

A simple illustration is shown in FIG. 1. The system 100 includes a transmitter 102 having a transmitting inductor 104. A receiver 106 has a receiver inductor 108. Preferably, the inductors have inductance values are on the order of micro-Henries. The respective inductors, 104, 108, preferably reside in electronic apparatus having additional functionality. For example, the transmitter may reside within a battery charger or power inverter apparatus 107. The receiver may reside in a communication, computer, imaging or other device 109, to cite a few examples. The respective inductors 104, 108, are placed within their respective apparatus such that they may be placed in physical proximity for inductive coupling during operation such that the inductors are in communication with one another for the exchange of power and/or data. The system 100 drives the inductors on one side (VACT1 and VACT2) and receives on the other side (VACR1 and VACR2). Such systems can be utilized for high bandwidth data transmission as well as power transfer across the inductive coupling (104, 108). The receiver 106 preferably includes an error detection mechanism 110 whereby the presence of errors in the received data signal may be identified. Upon detection of data errors, the system is adapted to implement one or more error correction algorithms designed to enhance data reception and/or transmission.

The placement of a resistor or other impedance element between the AC inputs of the receiver can be used to tune the frequency response and can eliminate ringing at the receiver terminals, as shown at R. The selection of a suitable resistor value attenuates or eliminates the ringing that otherwise would result from system parasitics. Too large a resistance value does not sufficiently dampen the ringing. Too small a resistance value interferes with the data signal. The peaking at high frequency causes ringing in the transient signal and can cause data errors if not managed properly. An extension of this basic principle uses an adjustable resistor such as a digitally controlled resistor or RDAC. Using an adjustable resistor allows the system to respond to changing environmental conditions, such as changes in temperature and changes in coil alignment. In any configuration, the system can be tuned automatically for improved system performance. This can result in fewer bit errors or higher transmission frequencies. This tuning can be done once at system startup, or periodically during normal operation, or in response to operational parameters. If the received data stream is oversampled, the oversampled data may be used to evaluate signal integrity. Thus, the adjustable resistor can be tuned during data transmission to improve the signal integrity and maintain an acceptable error rate and/or preferred transmission frequency.

In operation, the system 100 input is preferably returned to a known default value during periods when data is not being transmitted. To achieve this, the receiver inputs are preferably biased to drift to a known state when not being driven. An alternative is to implement the resistor R between the receiver terminals using two adjustable resistors, which may be used to set the appropriate bias levels. The adjustable resistors provide damping for improving signal integrity and also provide a known bias to the system during undriven states. Another benefit of using an adjustable resistor configuration is that it allows for the use of multiple transmission frequencies. Ringing in the system is highly dependent on the system parametrics such as parasitic capacitance and resistance as well as coil inductance. These parameters can be functions of the excitation frequency and vary as the frequency changes. Therefore, the system can exhibit different behavior at different transmission frequencies and may be dynamically adjusted for improved operation at any given frequency.

There are additional advantages to utilizing inductive data transmission and inductive power transmission simultaneously. In a system transmitting both power and data, the power loop can be regulated using communication through the inductive data path. This path has much higher bandwidth than other communication techniques such as modulating the power signal. Providing a high speed data path also enables additional functionality. Using the high speed data path for power control permits higher bandwidth in the power system and faster response times. In many systems, such as power converters and battery chargers, a separate charger IC or other voltage regulator on the secondary side may be used to control the secondary side voltage. Use of a high bandwidth feedback loop eliminates the need for the additional regulator on the secondary side. Voltage and/or current control can be achieved using the power loop with high bandwidth control through the coupled inductor data link. In many systems, the secondary side may advantageously have additional protection features built in to protect the secondary side circuits from over-voltage conditions. Preferably, if response times are fast, additional protection circuits on the secondary side may be unnecessary, reducing system cost and area.

Transmission of power and data simultaneously may potentially result in interference between the two paths. This has the potential to cause bad or missing bits in the data stream. In order to avoid this problem, the data and power signals may be alternated. Using this method, the power signal is periodically stopped. During this dead time in the power transmission, bursts of high frequency data are sent. Since the data bandwidth is very high, significant amounts of data can be transmitted even in a short window of time.

Sending and receiving data within the coupled inductor data transfer system may include the use of digital encoding and may be performed with a defined protocol or with a unique protocol determined for a particular application. Various techniques may also be employed for assuring data reliability and integrity. Oversampling of the received data may be performed to increase the reliability of the data. If the recovered oversampled data indicates that reliability is decreasing, the system is preferably adapted to take one or more dynamic steps to increase reliability of the recovered data. Preferably, the oversampling window may be shifted in either direction, either to the left or to the right of the current oversampling window. Alternatively, or additionally, the oversampling window size may be changed, either decreasing or increasing the window until an improvement is detected. In another available step, a change may be made in the number of sampling points used to determine the recovered data value, either decreasing or increasing the number of sampling points. Various functions may be used to seek the optimum sample, such as a simple Boolean function or a suitable more sophisticated algorithm.

Figure 2:
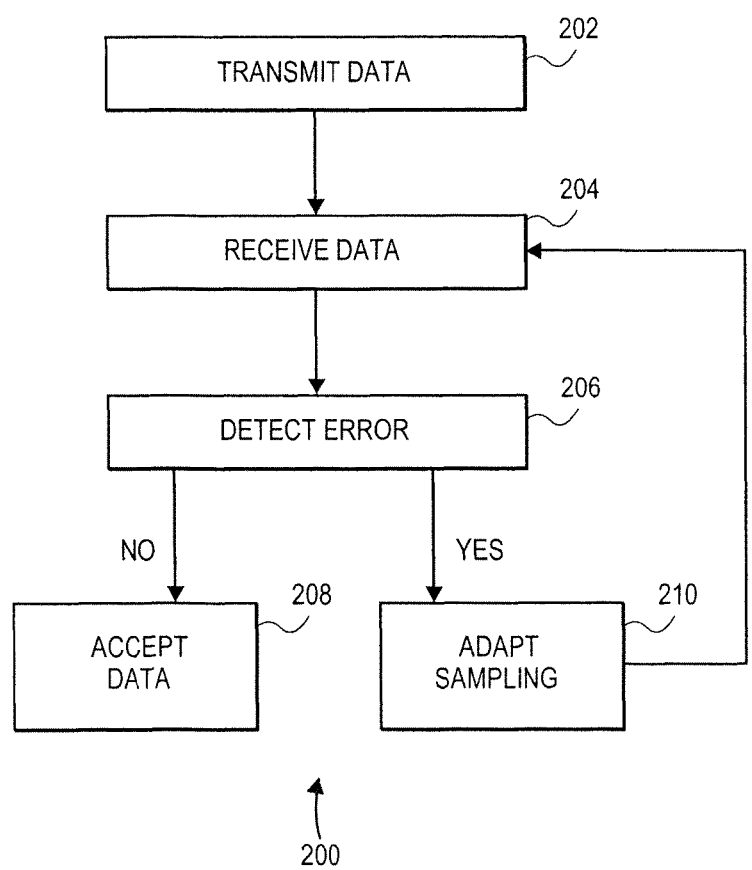
FIG. 2 is a diagram illustrating an example of an algorithm for controlling the operation of systems and methods for receiving wireless data according to an exemplary embodiment of the invention.

FIG. 2 is a diagram of an algorithm 200 for preserving data integrity in accordance with an exemplary embodiment of the invention. The algorithm 200 may be implemented using a computer, signal processing platform, or other programmable device. Data is transmitted 202 by a suitable transmitter and is received as a data signal for processing 204. In an error detection step 206, the data signal is checked for the presence of errors. Error checking may include techniques such as comparison with known data values or other suitable procedures. If no detectable errors are found 208 the data may be accepted and transferred or further processed according to the requirements of an associated application. In the event a data error is detected 210, receiver error correction steps may be implemented. In preferred embodiments of the invention, one or more of the above-mentioned oversampling techniques is used until data with acceptable integrity is obtained. Additional and alternative sampling techniques may also be used including but not limited to retransmission of data. Additional data received 204 is evaluated 206 in a similar manner and either accepted 208 or rejected as steps to adapt the sampling 210 to prevailing conditions are reiterated.

In a further example on the transmission side, the signal strength may be adaptively adjusted as needed. For example, in the event the coils become misaligned, imperfectly oriented, or their separation distance increases, the signal strength at the receiver tends to degrade. In this case, the transmit side of the system preferably increases its transmission signal strength as required, for example by increasing the drive voltage. Alternatively, or additionally, if the signal strength becomes degraded, the system may transmit using a different transmission frequency. Using a slower transmission rate may improve the signal integrity. The transmission rate may subsequently be increased in the event conditions improve.

Figure 3:
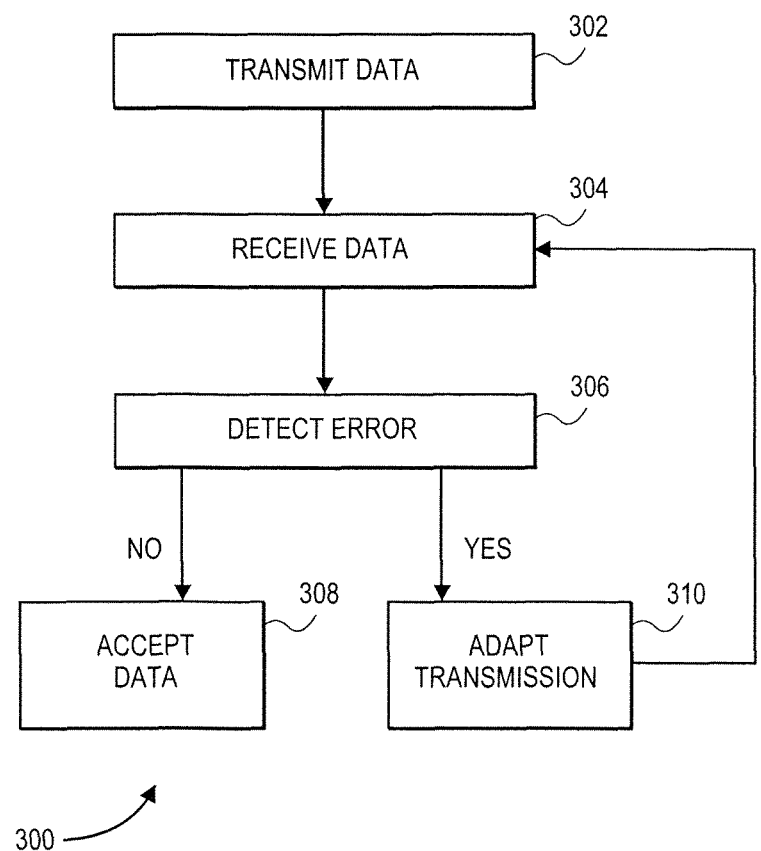
FIG. 3 is a diagram illustrating an example of an algorithm for controlling the operation of systems and methods for transmitting wireless data communication according to an exemplary embodiment of the invention.

FIG. 3 is a diagram depicting an algorithm 300 for adjusting transmission strength and/or frequency in accordance with an exemplary embodiment of the invention. The algorithm 300 may be implemented using a computer, signal processing platform, or other programmable device. Data is transmitted 302 by a suitable transmitter and is received as a data signal for processing 304. In an error detection step 306, the data signal is checked for the presence of errors. Error checking may include techniques such as comparison with known data values or other suitable procedures. If no detectable errors are found 308 the data may be accepted and transferred or further processed according to the requirements of an associated application. In the event a data error is detected 310, one or more transmission error correction steps may be implemented. In preferred embodiments of the invention, the data signal frequency and/or amplitude may be adjusted and subsequent received data evaluated 306 until an acceptable data signal is obtained. Transmitter error correction algorithms, of which this is an example, may be implemented independently or in combination with receiver error correction algorithms.

In an example of an error correction technique, the detection of inverted and non-inverted received data may be used as an indicator of inductor alignment or misalignment. In the event the receive coil is outside of the transmit coil, the received data appears to be inverted. If the receiver is anticipating a specific pattern, the inverted data results in the receiver failing to recognize the incoming data. Preferably, the system monitors both the inverted and non-inverted data stream and corrects for coil misalignment based on the comparison. At this point, either the receiver or the transmitter can modify the data stream to restore data integrity.

Figure 4:
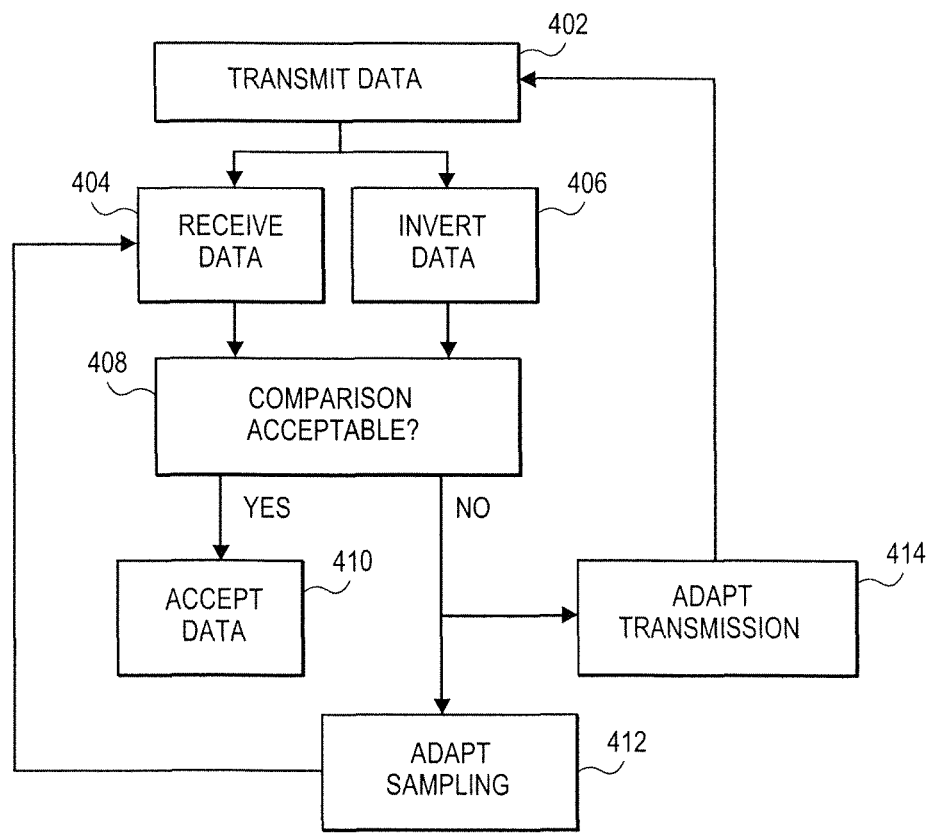
FIG. 4 is a diagram illustrating an example of an algorithm for controlling the operation of systems and methods for wireless data communication according to an exemplary embodiment of the invention.

FIG. 4 is a diagram illustrating an algorithm for comparing received data in accordance with an example of a preferred embodiment of the invention. This algorithm 400 may be implemented using a computer, signal processing platform, or other programmable device. Data is transmitted 402 by a suitable transmitter and is received as a data signal for processing 404. In addition, the data signal may be manipulated to produce an inverted version of the data 406. The data may be checked for the presence of errors by making a comparison 408 of the received data with the inverted data. If no errors are detected 410 the data may be accepted and transferred or further processed according to the requirements of an associated application. In the event a data error is detected, receiver error correction steps may be implemented 412. Additionally, transmitter error correction steps may also be taken 414.

While the making and using of various exemplary embodiments of the invention are discussed herein, it should be appreciated that the present invention provides inventive concepts which can be embodied in a wide variety of specific contexts. It should be understood that the invention may be practiced with power transfer functionality, such as in battery chargers and AC/DC converters. For purposes of clarity, detailed descriptions of functions, components, and systems familiar to those skilled in the applicable arts are not included. The methods and apparatus of the invention provide one or more advantages including but not limited to, data transfer capabilities, managed power transfer capabilities, and improved converter and charging systems with enhanced energy utilization and conservation attributes. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A data transmission system comprising: a transmitter having a transmitter inductor configured for wirelessly coupling with; a receiver having a receiver inductor, wherein data transmitted from the transmitter inductor may be received as a data signal by the receiver inductor, wherein the transmitter inductor is adapted for transmitting both power and data to the receiver inductor, wherein the transmitted power is operable to power an electronic device associated with the receiver; and an error detector for identifying the presence of data error in the data signal, wherein the error detector is configured to perform one or more of, a receiver error correction algorithm, and a transmitter error correction algorithm.

2. The system according to claim 1 wherein the receiver is configured to increase and decrease sample size in response to the receiver error correction algorithm.

3. The system according to claim 1 wherein the receiver is configured to increase and decrease sample points in response to the receiver error correction algorithm.

4. The system according to claim 1 wherein the receiver is configured to shift sampling in response to the receiver error correction algorithm.

5. The system according to claim 1 wherein the transmitter inductor is configured to increase and decrease a transmission power in response to the transmitter error correction algorithm.

6. The system according to claim 1 wherein the transmitter inductor is configured to increase and decrease a transmission frequency in response to the transmitter error correction algorithm.

7. The system according to claim 1 adapted for bidirectional exchange of data.

8. The system according to claim 1 wherein the transmitter comprises one of a power converter, or an energy storage device charger.

9. The system according to claim 1 wherein the electronic device associated with the receiver comprises one of a computer device, a communication device, an imaging device, a display device, an energy storage device, or a peripheral device.

10. A data transmission method comprising the steps of:
wirelessly transmitting a data signal from a transmitting inductor to a receiving inductor;
wirelessly transmitting a power signal from the transmitting inductor to the receiving inductor,
wherein the transmitted power signal is operable to power an electronic device associated with the receiving inductor;
identifying the presence of data error in the data signal; and performing one or more error correction algorithm for improving the data signal.

11. The method according to claim 10 further comprising using the data signal to transfer information about the power signal.

12. The method according to claim 10 further comprising alternating the transmission of a data signal with the transmission of the power signal.

13. The method according to claim 10 wherein the transmitting steps are bidirectional.

14. The method according to claim 10 wherein identifying the presence of data error in the data signal further comprises comparing the data signal to an inverted data signal.

15. The method according to claim 10 wherein the receiving inductor oversamples the data signal.

16. The method according to claim 10 wherein the receiving inductor oversamples the data signal, and wherein the performing one or more error correction algorithm for improving the data signal comprises shifting a sampling window.

17. The method according to claim 10 wherein the receiving inductor oversamples the data signal, and wherein the performing one or more error correction algorithm for improving the data signal comprises changing a size of a sampling window.

18. The method according to claim 10 wherein the receiving inductor oversamples the data signal, and wherein the performing one or more error correction algorithm for improving the data signal comprises changing a number of sampling points.

19. The method according to claim 10 wherein the receiving inductor oversamples the data signal, and wherein the performing one or more error correction algorithm for improving the data signal comprises changing a transmission power.

20. The method according to claim 10 wherein the receiving inductor oversamples the data signal, and wherein the performing one or more error correction algorithm for improving the data signal comprises changing a transmission frequency.

21. The method according to claim 10 further comprising the step of dynamically tuning at least one of the transmitter and receiver for optimizing the data signal.

* * * * *